June 1, 1937.  H. W. LORD  2,082,644

ELECTRIC VALVE TRANSLATING CIRCUIT

Filed Jan. 2, 1936

Inventor:
Harold W. Lord,
by Harry E. Dunham
His Attorney.

Patented June 1, 1937

2,082,644

UNITED STATES PATENT OFFICE 2,082,644

ELECTRIC VALVE TRANSLATING CIRCUIT

Harold W. Lord, Schenectady, N. Y., assignor to General Electric Company, a corporation of New York Application January 2, 1936, Serial No. 57,191

9 Claims. (Cl. 250—27)

My invention relates to electric valve translating circuits and more particularly to such circuits in which the flow of current is controlled by controlling the conductivity of an electric valve or valves.

Such circuits may be used for periodically interrupting the flow of current to a load device. Some circuits, due to their electric energy storage characteristics, will not operate satisfactorily if the current is supplied thereto in the same direction at frequent intervals. When resistance welding at high speeds where the current is interrupted frequently and flows through the transformer rapidly in the same direction for periods of a half cycle or less of the source of alternating current supply, an accumulation of residual magnetism occurs in the welding transformer which produces a saturation effect which causes the transformer to transmit insufficient current to perform the welding operation. In line welding operations where the secondary of the transformer is normally maintained in closed circuit condition during the welding operation, the effect of residual magnetism in the transformer is sustained for longer periods of time and the residual quickly builds up to produce this saturation effect.

If positive and negative values of an alternating current source are alternately supplied to load circuits having an energy storage characteristic such as the welding circuit above referred to, it is possible to obtain frequent interruptions to the flow of current without causing a saturation effect.

It is an object of my invention to provide an electric valve translating circuit by means of which alternate positive and negative values of an alternating current source may be repeatedly supplied at short intervals of predetermined equal duration to a load circuit having an energy storage characteristic.

It is a further object of my invention to provide control circuits for high speed spot and line welding apparatus in which the flow of welding current is limited to a half cycle or a part of a half cycle of the source of supply.

Figure 1:
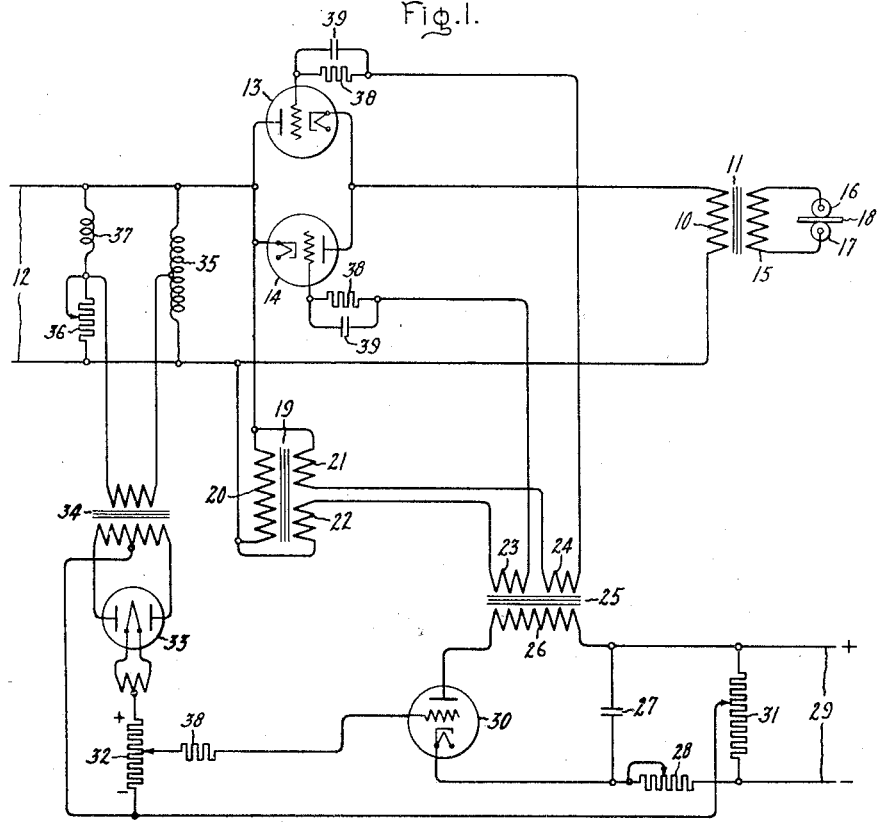
Figure 2:
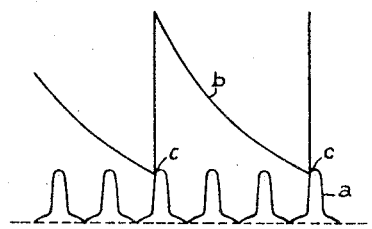

Further objects of my invention will become apparent from a consideration of the following description of one embodiment thereof, diagrammatically illustrated in Fig. 1 of the accompanying drawing as applied to a resistance line welding machine. Fig. 2 illustrates graphically certain control voltages in the timer circuit of Fig. 1.

In the control circuit illustrated in the drawing the primary 10 of a welding transformer 11 and a source of alternating current supply 12 are interconnected by a pair of controlled electric valves 13 and 14 which are reversely connected in parallel with one another. These valves are each provided with an anode, a cathode and a control element and may be of any of the several types well known in the art, although I prefer to use valves of the vapor or gaseous electric discharge type. The secondary 15 of the welding transformer 11 is connected to welding electrodes 16 and 17 adapted to make engagement during welding with the work 18 located therebetween.

The control elements of the valves 13 and 14 are normally held 180 degrees out of phase with respect to their anodes by a bias voltage obtained from a transformer 19 whose primary 20 is connected across the alternating current source and whose secondaries 21 and 22 are connected in the control circuit of these valves. The secondaries 23 and 24 of a transformer 25 also supply excitation to the control elements of valves 13 and 14. The primary 26 of transformer 25 is excited by the discharge of a capacitor 27. This condenser is charged through an adjustable resistor 28 from a source of direct current supply 29 and discharged through an electric valve 30 provided with an anode, a cathode and a control element. Excitation is supplied to the control element of valve 30 from a potentiometer or resistance circuit 31 connected across the source of direct current supply 29 and a potentiometer or resistance circuit 32 connected through a full wave rectifier 33 and a transformer 34 to the source of alternating current supply 12 by means of a phase shift circuit comprising an inductive winding 35 and a resistor 36 and an inductive winding 37 connected in series with one another. The transformer 34 is preferably of the type that generates in its secondary peaked voltage waves. Its secondary is connected to the full wave rectifier 33 and its primary is connected between the electrical midpoint of winding 35 and the junction point of the reactor 37 and the resistor 36. Either or both the reactor 37 and the resistor 36 may be made adjustable in order to obtain the desired phase shift. In the drawing the resistor 36 has been indicated as adjustable.

Grid protecting resistors 38 are connected in the excitation circuits for the control elements of valves 13, 14 and 30. Condensers 39 are connected across the resistors 38 in the excitation circuits of valves 13 and 14 to supply a direct current component of bias in addition to the alternating current component of bias for the control elements of these valves.

The system will be better understood from a consideration of its operation, which is as follows:

Valves 13 and 14 are normally rendered nonconductive by the excitation voltage derived from the secondaries 21 and 22 of transformer 19 which is 180 degrees out of phase with respect to the anode voltage of these valves. These valves are rendered conductive by the excitation voltage obtained from the secondaries 23 and 24 of transformer 25 when the condenser 27 is discharged through the primary 26 of this transformer when electric valve 30 is rendered conductive.

The circuit for charging and discharging the condenser 27 constitutes a timer circuit which may be adjusted to control the conductivity of valves 13 and 14. The condenser 27 is charged through the resistor 28 from the source of supply 29. At the beginning of the charging period the cathode of valve 30 is at the positive potential of the source of supply 29 and as the condenser 27 charges, this potential gradually decreases until the control element of valve 30 becomes positive with respect to its cathode (assuming a valve having a zero critical grid voltage characteristic), allowing the valve to conduct and discharge the condenser 27. The instantaneous voltage impressed upon the control element of valve 30 is the algebraic sum of the instantaneous voltages across resistor 28, the lower portion of potentiometer 31, which under some conditions of adjustment may be zero, and the lower portion of potentiometer 32. The effective control voltage is thus the resultant of a periodic voltage derived from the condenser circuit and a periodic voltage of twice the frequency of the source of supply 12. In Fig. 2 of the drawing the voltage derived from potentiometers 31 and 32 is represented by the curve a and the periodic voltage derived from the condenser circuit by the curve b. When the resultant voltage between the cathode and control element of valve 30 becomes positive at points c, the valve 30 becomes conductive and discharges the condenser 27. The discharge of condenser 27 through transformer 25 renders the valves 13 and 14 conductive.

The timing circuit, including condenser 27, is synchronized with the frequency of the source 12 by the voltage of double line frequency supplied through transformer 34 and full wave rectifier 33. When a peaking transformer is used the control voltage for valve 30 will have a steep wave front as illustrated in Fig. 2 at a. With this type of excitation it is possible to adjust the timer circuit to operate at submultiples of twice the line frequency and stay in synchronism with the alternating current supply. By adjusting the timer circuit it may be made to operate on odd submultiples of the supply frequency and the valves 13 and 14 will be rendered conductive alternately to supply current for a whole cycle or a part of a half cycle, depending upon the phase position of the synchronizing voltage of the timer circuit with respect to the supply voltage 12. Shifting the phase of the source of twice supply frequency derived from potentiometer 32, shifts the point in the cycle of the supply voltage at which valve 30 conducts and thus makes it possible to adjust the periods during which current is supplied to the load for periods less than one-half cycle. The period of the timer circuit may be determined by adjusting the resistor 28 through which the condenser 27 is charged or by adjusting the sliders on potentiometers 31 and 32. As shown in Fig. 2, the condenser discharges periodically and the voltage applied to the control elements of valves 13 and 14 through transformer 25 has a period equal to 1½ cycles of the source of supply. The timer circuit may be adjusted to render this period equal to 2½ cycles, 3½ cycles, etc., and when so adjusted the timer circuit constitutes a circuit for generating a periodic voltage having a period equal to an odd number of half cycles of the source of alternating current supply to which the welding transformer 11 is connected through valves 13 and 14.

My present invention is a modification of my prior invention described and claimed in application Serial No. 585,292, for Circuit interrupters, filed January 7, 1932. In my present invention the timer circuit disclosed in my earlier filed application has been modified for the generation of a control potential having a period equal to an odd number of half cycles of the source of supply.

My invention is not limited to the particular circuit connections illustrated and described, since other arrangements will occur to those skilled in the art, in view of my above disclosure. It is, of course, apparent that any suitable means may be employed for normally rendering valves 13 and 14 nonconductive and the arrangement described for holding the voltages of the control elements of those valves 180 degrees out of phase with respect to their anode voltages may be replaced by other means for rendering the valves normally nonconductive. A source of control voltage having a frequency twice that of the source of supply 12 may be obtained for valve 30 in the timer circuit in any suitable manner other than that above disclosed. It is, of course, not necessary that this voltage have a peaked form, although by employing a peaked voltage wave, inaccuracies resulting from variations in the characteristics of the electric valves is for the most part avoided. The peaked voltage wave also causes the system to operate with greater accuracy by making the periods of oscillations substantially equal in duration.

As pointed out above the circuit control described is particularly suitable for supplying resistance welding apparatus where the current is interrupted frequently and flows through the welding transformer in the same direction for periods of a half cycle or less of the source of alternating current supply. The circuit could be used, however, for supplying energy to any circuit having an energy storage characteristic which will not operate satisfactorily if the current is supplied thereto in the same direction at frequent intervals. The energy storage characteristic may result from residual magnetism producing a saturation effect as above described in connection with the welding transformer, or may result from an electrostatic condition due to the capacity of the translating circuit such as may occur in transmission lines or cables. By alternately supplying positive and negative values of the alternating current source to such load circuits saturation effects therein, due to what may be termed a direct current component, will be balanced out and the supply of alternating current to a load circuit may be interrupted periodically with alternate positive and negative values of the alternating current source of supply.

What I claim as new and desire to secure by Letters Patent of the United States is:

1. An electric valve translating circuit comprising a source of alternating current, a load circuit, a pair of electric valves reversely connected in parallel and interconnecting said source and said load circuit, each of said valves having a control element, and means for applying to the control element of each of said valves a potential that normally renders said valves nonconductive and a potential that periodically renders said valves conductive, said periodic potential having a period equal to an odd number of half cycles of said source.

2. An electric valve translating circuit comprising a source of alternating current, a circuit having an electric energy storage characteristic, a pair of controlled electric valves reversely connected in parallel and interconnecting said source and said circuit, means for rendering said valves normally nonconductive, and electric circuit means synchronized with the frequency of said source and having a period equal to an odd number of half cycles of said source for rendering said valves conductive.

3. An electric valve translating circuit comprising a source of alternating current, a pair of electric valves reversely connected in parallel and interconnecting said source and said load circuit each of said valves having a control element and being normally rendered nonconductive, a load circuit, a circuit for generating a periodic voltage having a period equal to an odd number of half cycles of said source of alternating current, and means for applying a periodic voltage derived from said generating circuit and capable of rendering said valves alternately conductive.

4. An electric valve translating circuit comprising a source of alternating current, a load circuit, a pair of electric valves reversely connected in parallel and interconnecting said source and said load circuit each of said halves having a control element and being normally rendered nonconductive, a circuit for generating a periodic voltage having a period equal to an odd number of half cycles of said source, means for shifting the phase of said generated periodic voltage relative to said source, and means for applying a periodic voltage derived from said generating circuit and capable of rendering said valves alternately conductive.

5. An electric valve translating circuit comprising a source of alternating current, a transformer whose secondary circuit is normally maintained in a closed circuit condition, a pair of electric valves reversely connected in parallel and interconnecting said source and the primary of said transformer, each of said valves having a control element and being normally rendered nonconductive, a circuit for generating a periodic voltage having a period equal to an odd number of half cycles of said source of alternating current, and means for applying to the control element of each of said reversely connected valves a periodic voltage derived from said generating circuit and capable of rendering said valves alternately conductive.

6. An electric valve translating circuit comprising a source of alternating current, a load circuit, a condenser, circuits for charging and discharging said condenser, an electric valve having a control element and being connected in the discharge circuit of said condenser, means for applying to the control element of said valve a periodic voltage derived from said condenser circuit and a periodic voltage of twice the frequency of said source, a pair of electric valves reversely connected in parallel and interconnecting said source and said load circuit, each of said valves having a control element and being normally rendered nonconductive, and means for applying to the control element of each of said reversely connected valves a periodic voltage derived from the discharge circuit of said condenser and capable of rendering said reversely connected valves alternately conductive.

7. An electric valve translating circuit comprising a source of alternating current, a load circuit, a resistance circuit connected through a full wave rectifier to said source, a condenser, a circuit for charging said condenser through a resistor and discharging said condenser through an electric valve having a control element, means for applying to the control element of said valve a periodic voltage derived from the charging circuit of said condenser and a voltage derived from said resistance circuit connected through said rectifier, a pair of electric valves reversely connected in parallel and interconnecting said source and said load circuit, each of said valves having a control element and normally being rendered nonconductive, and means for applying to the control element of each of said reversely connected valves a periodic voltage derived from the discharge circuit of said condenser and capable of rendering said reversely connected valves alternately conductive.

8. An electric valve translating circuit comprising a source of alternating current, a load circuit, a potentiometer connected through a full wave rectifier and a peaking transformer to said source, a condenser, a circuit for charging said condenser through a resistor and discharging said condenser through an electric valve having a control element, means for applying to the control element of said valve a voltage derived from said condenser circuit and a voltage derived from said potentiometer the resultant of which periodically renders said valve conductive, a pair of electric valves reversely connected in parallel and interconnecting said source and said load circuit, each of said valves having a control element and being normally rendered nonconductive, and means for applying to the control element of each of said reversely connected valves a periodic voltage derived from the discharge circuit of said condenser and capable of rendering said reversely connected valves alternately conductive.

9. An electric valve translating circuit comprising a source of alternating current, a circuit having an electric energy storage characteristic, a potentiometer connected through a full wave rectifier to said source, a condenser, a circuit for charging said condenser through a resistor and discharging said condenser through an electric valve having a control element, means for applying to the control element of said valve a periodic voltage derived from the charging circuit of said condenser and a voltage derived from said potentiometer the resultant of which periodically renders said valve conductive, a pair of electric valves reversely connected in parallel and interconnecting said source and said circuit having an electric energy storage characteristic, each of said valves having a control element and being normally rendered nonconductive, and means for applying to the control element of each of said reversely connected valves a periodic voltage derived from the discharge circuit of said condenser and capable of rendering said reversely connected valves alternately conductive.

HAROLD W. LORD.